United States Patent
Balmakhtar et al.

(10) Patent No.: US 12,382,379 B2
(45) Date of Patent: Aug. 5, 2025

(54) NETWORK EXPOSURE FUNCTION (NEF) SLICE IN A WIRELESS COMMUNICATION NETWORK

(71) Applicant: T-Mobile Innovations LLC, Overland Park, KS (US)

(72) Inventors: Marouane Balmakhtar, Fairfax, VA (US); Gregory David Schumacher, Holliston, MA (US); Geoffrey Todd Gibson, Rowlett, TX (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 733 days.

(21) Appl. No.: 17/536,832

(22) Filed: Nov. 29, 2021

(65) Prior Publication Data

US 2023/0171680 A1   Jun. 1, 2023

(51) Int. Cl.
| | | |
|---|---|---|
| *H04W 48/18* | (2009.01) | |
| *H04W 4/02* | (2018.01) | |
| *H04W 8/02* | (2009.01) | |
| *H04W 36/32* | (2009.01) | |
| *H04W 72/20* | (2023.01) | |
| *H04W 76/10* | (2018.01) | |

(52) U.S. Cl.
CPC ............ *H04W 48/18* (2013.01); *H04W 8/02* (2013.01); *H04W 72/20* (2023.01); *H04W 76/10* (2018.02); *H04W 4/025* (2013.01); *H04W 36/32* (2013.01)

(58) Field of Classification Search
CPC ..... H04W 48/18; H04W 76/10; H04W 72/20; H04W 72/25; H04W 72/27; H04W 72/29; H04W 8/02; H04W 8/20; H04W 36/32; H04W 36/0072; H04W 36/322; H04W 36/324; H04W 36/326; H04W 36/328; H04W 4/025; H04W 80/04; H04L 12/5691
See application file for complete search history.

(56) References Cited

U.S. PATENT DOCUMENTS

| | | |
|---|---|---|
| 7,860,167 B2 | 12/2010 | Le Dinh et al. |
| 10,524,166 B2 | 12/2019 | Youn et al. |
| 10,531,420 B2 | 1/2020 | Li et al. |
| 10,652,098 B2 | 5/2020 | Kim |
| 10,742,396 B2 | 8/2020 | Suthar et al. |
| 10,764,789 B2 | 9/2020 | Qiao et al. |
| 10,791,508 B2 | 9/2020 | Park et al. |
| 10,999,787 B2 | 5/2021 | Dao et al. |
| 2019/0053147 A1 | 2/2019 | Qiao et al. |
| 2019/0261260 A1* | 8/2019 | Dao ................ H04W 36/0011 |
| 2021/0099905 A1* | 4/2021 | Huang ............. H04W 28/0215 |
| 2022/0104004 A1* | 3/2022 | Huang ................. H04W 48/16 |
| 2024/0179081 A1* | 5/2024 | Purkayastha ....... H04L 41/0806 |

* cited by examiner

*Primary Examiner* — Brian T Le

(57) ABSTRACT

A wireless communication network serves a Network Exposure Function (NEF) slice to User Equipment (UE). An Access and Mobility Management Function (AMF) selects a NEF slice for the UE. A Session Management Function (SMF) selects a NEF address for the NEF slice for the UE. A User Plane Function (UPF) exchanges Application Programming Interface (API) calls and responses between the UE and a NEF based on the NEF address. The NEF exchanges the API messages with the UE over the UPF. The NEF slice may comprise an edge NEF slice that is selected based on the geographic location of the UE and that features a local NEF element that is coupled to a core NEF element.

20 Claims, 12 Drawing Sheets

NETWORK EXPOSURE FUNCTION (NEF) SLICE IN A WIRELESS COMMUNICATION NETWORK

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network. In another example, a vehicle may execute a navigation application that communicates with a direction server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements. The network elements are often clustered together in network data centers.

The network elements comprise Access and Mobility Management Functions (AMFs), Session Management Functions (SMFs), User Plane Functions (UPFs), Network Exposure Functions (NEFs), and the like. Some of the network elements like are grouped into wireless network slices that deliver data services like massive Machine Type Communications (mMTC), Ultra-Reliable Low-Latency Communications (URLLC), enhanced Mobile Broadband (eMBB), and/or some other networking product. For example, a UPF that features low-latency and high-reliability would be used for a URLLC slice, while a different UPF that features high-bandwidth and tunnel-mobility would be used for an eMBB slice.

The NEFs interact with network elements like AMFs and SMFs to obtain UE status and network information. The NEFs expose the UE status and network information to other network elements and application servers. Unfortunately, the NEFs are not effectively integrated with the wireless network slices. Moreover, NEFs are not efficiently deployed to deliver local or low-latency NEF services to the wireless user devices.

TECHNICAL OVERVIEW

A wireless communication network serves a Network Exposure Function (NEF) slice to User Equipment (UE). An Access and Mobility Management Function (AMF) selects a NEF slice for the UE. A Session Management Function (SMF) selects a NEF address for the NEF slice for the UE. A User Plane Function (UPF) exchanges Application Programming Interface (API) calls and responses between the UE and a NEF based on the NEF address. The NEF exchanges the API messages with the UE over the UPF. The NEF slice may comprise an edge NEF slice that is selected based on the geographic location of the UE and that features a local NEF element that is coupled to a core NEF element.

DETAILED DESCRIPTION

Figure 1:
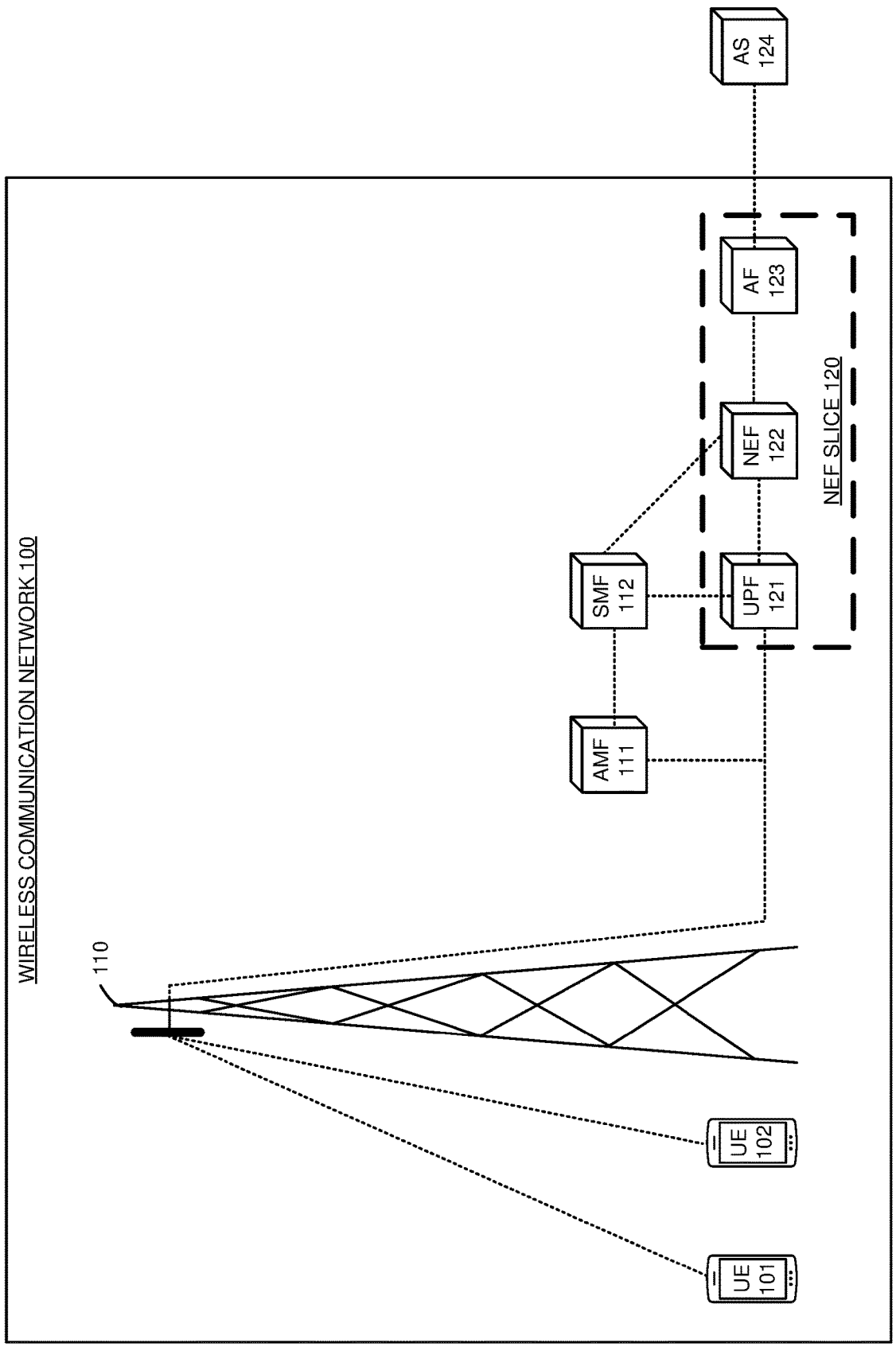
FIG. 1 illustrates an exemplary wireless communication network to serve a Network Exposure Function (NEF) slice to User Equipment (UE).

FIG. 1 illustrates an exemplary wireless communication network 100 to serve Network Exposure Function (NEF) slice 120 to User Equipment (UEs) 101-102. Wireless communication network 100 comprises UEs 101-102, wireless access node 110, Access and Mobility Management Function (AMF) 111, Session Management Function (SMF) 112, and NEF slice 120. NEF slice 120 comprises User Plane Function (UPF) 121, NEF 122, and Application Function (AF) 123. UEs 101-102 comprise computers, phones, vehicles, sensors, robots, or some other data appliance with communication circuitry. Wireless communication network 100 is simplified for clarity and typically includes far more UEs and access nodes.

Various examples of network configuration and operation are described herein. In some examples, UE 101 attaches to wireless access node 110 and registers with AMF 111. In response, AMF 111 selects NEF slice 120 for UE 101—typically in response to a report from UE 101 that indicates NEF slice capability. SMF 112 selects a NEF address for NEF slice 120 for UE 101. UPF 121 exchanges Application Programming Interface (API) messages like calls and responses between UE 101 and NEF 122 based on the NEF address. NEF 122 exchanges the API messages with UE 101 over UPF 121. Contemporaneously, UE 102 attaches to wireless access node 110 and registers with AMF 111. In response, AMF 111 selects NEF slice 120 for UE 102—typically in response to a report from UE 102 that indicates NEF slice capability. SMF 112 selects a NEF address for NEF slice 120 for UE 102. UPF 121 exchanges API messages between UE 102 and NEF 122 based on the NEF address. NEF 122 exchanges the API messages with UE 102 over UPF 121.

In some examples, UEs 101-102 share UE data like sensor readings and pertinent network data like location and service quality over NEF 122 using their NEF slice APIs. NEF slice 120 may comprise an edge slice that is located near wireless access node 110. AMF 111 may select an edge NEF slice for UEs 101-102 based on UE location in addition to UE capability. Application Server (AS) 124 may exchange API messages with NEF 112 over AF 123. UEs 101-102 and AS 124 may share user data and network data over NEF 122 using the NEF slice APIs. Different types of UEs may also use NEF slice 120. For example, non-Third Generation Partnership Project (non-3GPP) UEs may access NEF slice 120 over the internet and a non-3GPP Interworking Function (IWF).

Advantageously, NEF 122 is effectively integrated with wireless network slice 120 with UPF 121. Moreover, NEF slice 120 may be efficiently located at the network edge to deliver local, low-latency NEF services to UEs 101-102.

UEs 101-102 and wireless access node 110 communicate over wireless links that use wireless technologies like Fifth Generation New Radio (5GNR), Long Term Evolution (LTE), Institute of Electrical and Electronic Engineers (IEEE) 802.11 (WIFI), Low-Power Wide Area Network (LP-WAN), Bluetooth, and/or some other wireless communication protocols. The components of wireless communication network 100 communicate over network connections that comprise metallic wiring, glass fibers, radio channels, or some other communication media. The network connections use technologies like IEEE 802.3 (ENET), Internet Protocol (IP), Time Division Multiplex (TDM), Data Over Cable System Interface Specification (DOCSIS), General Packet Radio Service Transfer Protocol (GTP), 5GNR, LTE, WIFI, LP-WAN, Bluetooth, virtual switching, inter-processor communication, bus interfaces, and/or some other data communication protocols. UEs 101-102 and wireless access node 110 comprise radios. UEs 101-102, wireless access nodes 110, AMF 111, SMF 112, and slice 120 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
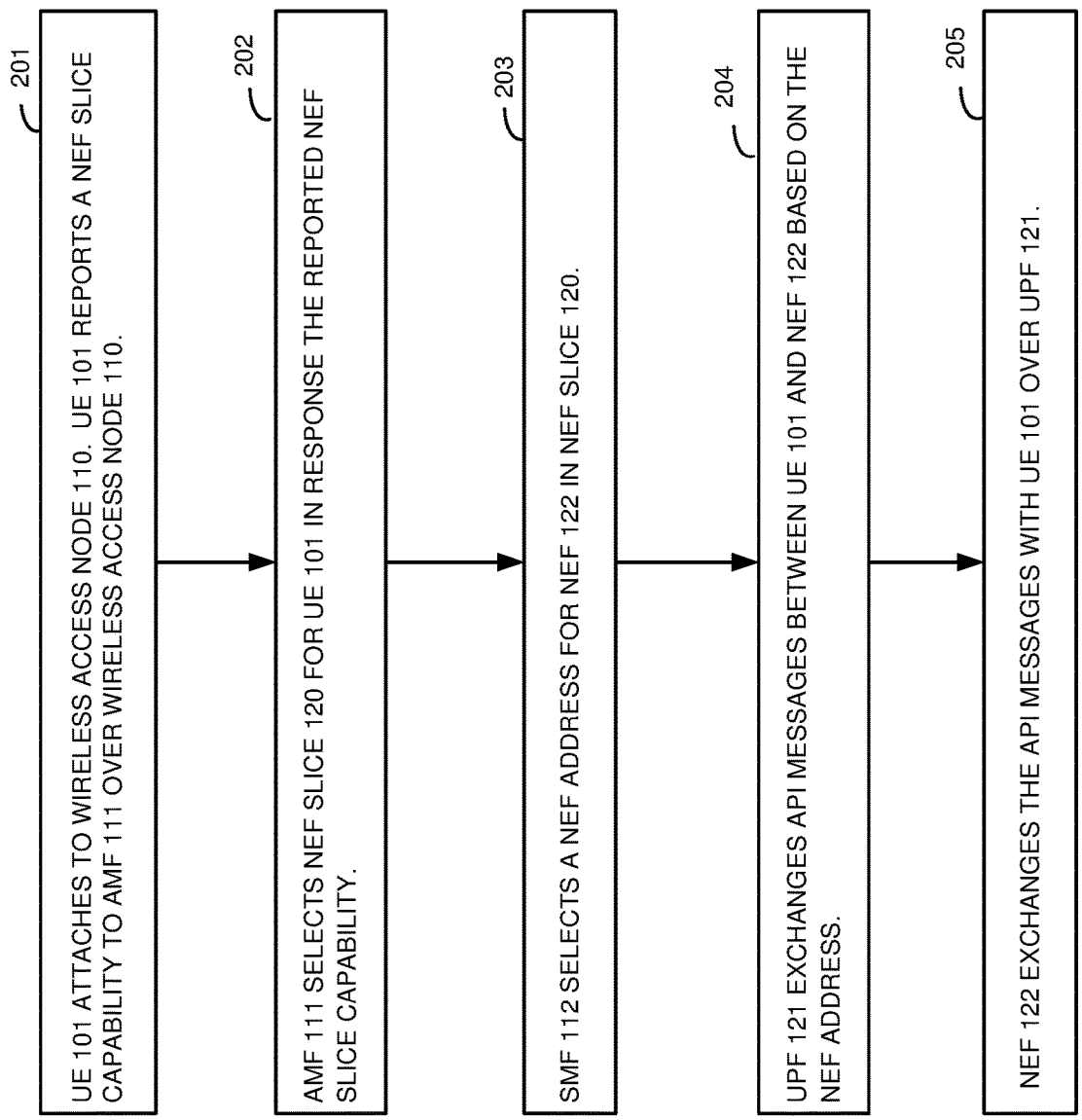
FIG. 2 illustrates an exemplary operation of the wireless communication network to serve the NEF slice to the UE.

FIG. 2 illustrates an exemplary operation of wireless communication network 100 to serve NEF slice 120 to UEs 101-102. The operation may vary in other examples. UE 101 attaches to wireless access node 110 (201). UE 101 reports a NEF slice capability to AMF 111 over wireless access node 110 (201). AMF 111 selects NEF slice 120 for UE 101 in response the reported NEF slice capability (202). SMF 112 selects a NEF address for NEF 122 in NEF slice 120 (203). UPF 121 exchanges API messages between UE 101 and NEF 122 based on the NEF address (204). NEF 122 exchanges the API messages with UE 101 over UPF 121 (205).

Figure 3:
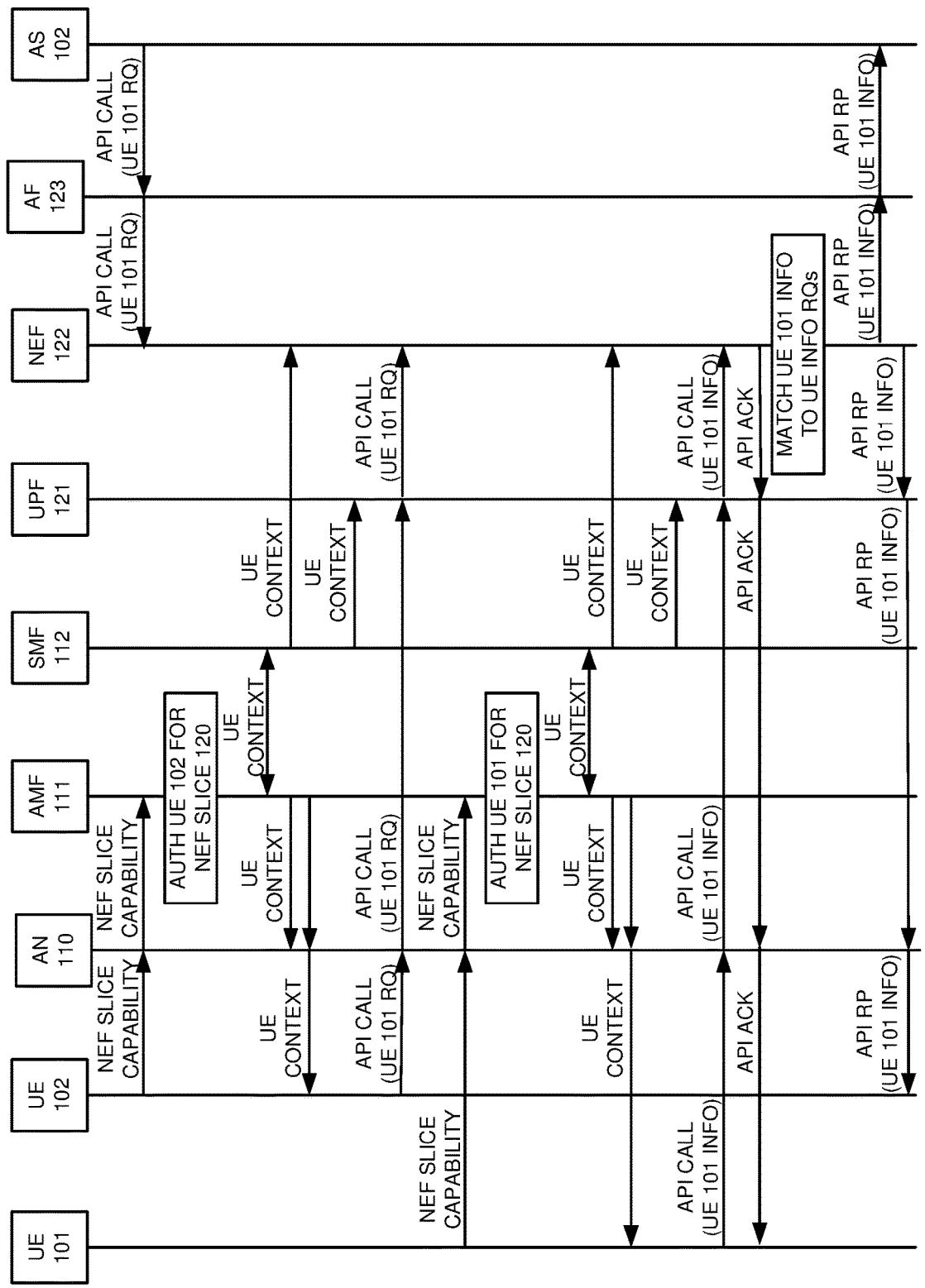
FIG. 3 illustrates an exemplary operation of the wireless communication network to serve the NEF slice to the UE.

FIG. 3 illustrates an exemplary operation of wireless communication network 100 to serve NEF slice 120 to UEs 101-102. The operation may vary in other examples. AS 124 transfers an API call to NEF 122 over AF 123 for UE 101 information. UE 102 attaches to wireless access node (AN) 110 and reports its NEF slice capability to AMF 111. In response, AMF 111 authenticates UE 102 and authorizes NEF slice 120 for authenticated UE 102. AMF 111 and SMF 112 interact to select UE context for UE 102 and slice 120 (UE address, UPF address, NEF address, data rate, latency, and the like). SMF 112 transfers the UE context to NEF 122 and UPF 121. AMF 111 transfers the UE context to wireless access node 110 and UE 102. In response to the UE context, UE 102 transfers a NEF API call for UE 101 information to NEF 122 over wireless access node 110 and UPF 121. Contemporaneously, UE 101 attaches to wireless access node 110 and reports its NEF slice capability to AMF 111. In response, AMF 111 authenticates UE 101 and authorizes NEF slice 120 for authenticated UE 101. AMF 111 and SMF 112 interact to select UE context for UE 101 and slice 120 (UE address, UPF address, NEF address, data rate, latency, and the like). SMF 112 transfers the UE context to NEF 122 and UPF 121. AMF 111 transfers the UE context to wireless access node 110 and UE 101. In response to the UE context, UE 101 transfers a NEF API call to post UE 101 information to NEF 122 over wireless access node 110 and UPF 121. NEF 122 acknowledges (ACK) the API call to UE 101 over wireless access node 110 and UPF 121. NEF 122 matches the API call from UE 102 for UE 101 information and the API call from UE 101 to post UE 101 information. NEF 122 transfers the UE 101 information in an API response to AS 124 over AF 123. NEF 122 transfers the UE 101 information in an API response (RP) to UE 102 over wireless access node 110 and UPF 121.

Figure 4:
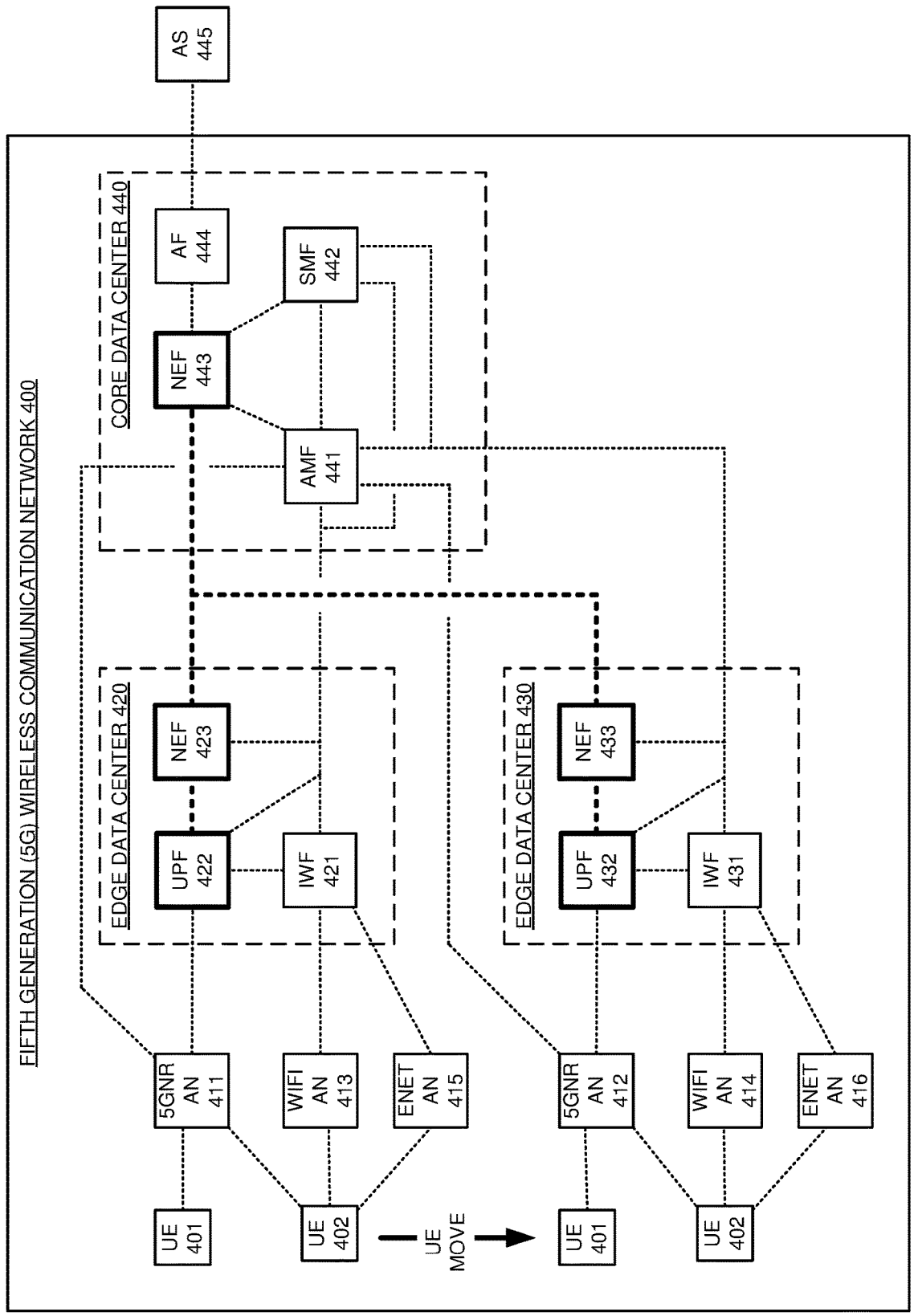
FIG. 4 illustrates an exemplary Fifth Generation (5G) wireless communication network to serve mobile edge NEF slices to UEs.

FIG. 4 illustrates exemplary Fifth Generation (5G) wireless communication network 100 to serve mobile edge NEF slices to UEs 401-402. 5G wireless communication network 400 comprises an example of wireless communication network 100, although network 100 may differ. 5G wireless communication network 400 comprises: UEs 401-402, 5GNR Access Nodes (ANs) 411-412, WIFI ANs 413-414, ENET ANs 415-416, edge data centers 420 and 430, and core data center 440. Edge data center 420 comprises non-3GPP Interworking Function (IWF) 421, User Plane Function (UPF) 422, and NEF 423. In edge data center 420, an edge NEF slice comprises IWF 421, UPF 422, and NEF 423. Edge data center 430 comprises non-3GPP IWF 431, UPF 432, and NEF 433. In edge data center 430, an edge NEF slice comprises IWF 431, UPF 432, and NEF 433. Core data center 440 comprises Access and Mobility Management Function (AMF) 441, Session Management Function (SMF) 442, NEF 442, and Application Function (AF) 444. AF 444 is linked to AS 445. 5G wireless communication network 400 is also simplified for clarity and typically comprises more UEs, ANs, data centers, and network functions like UPFs than shown.

NEFs 423, 433, and 443 form a distributed NEF. Core NEF 443 obtains network status information and distributes the status information to edge NEFs 423 and 433. Edge NEFs 423 and 433 also develop network status information and distribute the status information to core NEF 443. Thus, AS 445 may access network status information from edge NEFs 423 and 433 over core NEF 443. AS 445 may subscribe to UE status information like authentication status and geographic location from edge NEFs 423 and 433 over NEF 443. UEs 401-402 may subscribe to the UE status information from edge NEFs 423 and 433. UEs 401-402 may subscribe to the AS 445 instructions and data from core NEF 443 over edge NEFs 423 and 433. In some examples, a UPF in core data center 440 is used to couple core NEF 443 to edge NEF 423 and edge NEF 433.

UE 401 attaches to 5GNR AN 411 and reports an edge NEF slice capability to AMF 441. AMF 441 authorizes an edge NEF slice for UE 401. AMF 441 and interacts with SMF 442 to determine context for UE 401 and the edge NEF slice—including an address for edge NEF 423. AMF 441 may select the edge NEF slice for UE 401 based on the geographic location of UE 401. SMF 442 may select the address for edge NEF 423 based on the geographic location of UE 401. AMF 441 signals the context to 5GNR AN 411 and UE 401. SMF 442 signals the context to UPF 422 and core NEF 443. Core NEF 443 signals the context to edge NEF 423. UE 401 transfers Application Programming Interface (API) calls to edge NEF 423 over 5GNR AN 411 and UPF 422. Edge NEF 423 forwards some of the API calls to core NEF 443 and transfers API responses for the other API calls to UE 401 over UPF 422 and AN 411. Core NEF 443 transfers API responses for the forwarded API calls to UE 401 over edge NEF 423, edge UPF 422, and 5GNR AN 411. One of the API calls from UE 401 to edge NEF 423 requests status information for UE 402. Edge NEF 423 (and possibly core NEF 443) respond to the requests with status information for UE 402.

UE 402 attaches to WIFI AN 413. UE 402 registers with IWF 421 over WIFI AN 413. UE 402 reports an edge NEF slice capability to AMF 441 over IWF 421. AMF 441 authorizes an edge NEF slice for UE 402. AMF 441 interacts with SMF 442 to determine context for UE 402 and the edge NEF slice—including an address for edge NEF 423. AMF 441 may select the edge NEF slice for UE 402 based on the geographic location of UE 402. SMF 442 may select the address for edge NEF 423 based on the geographic location of UE 402. AMF 441 signals the context to IWF 421 and UE 401. SMF 442 signals the context to UPF 422 and core NEF 443. Core NEF 443 signals the context to edge NEF 423. UE 402 transfers API calls to edge NEF 423 over WIFI AN 413, IWF 421, and UPF 422. Edge NEF 423 forwards some of the API calls to core NEF 443 and transfers API responses for the other API calls to UE 402 over UPF 422, IWF 421, and AN 413. Core NEF 443 transfers API responses for the forwarded API calls to UE 402 over edge NEF 423, UPF 422, IWF 421, and AN 413. One of the API calls from UE 402 to edge NEF 423 requests status information for UE 401. Edge NEF 423 (and possibly core NEF 443) respond to the requests with status information for UE 401.

UEs 401-402 use the edge slice to write data to edge NEF 423 with minimal latency. UEs 401-402 also use the edge slice to read data from edge NEF 423 with minimal latency. AS 445 may read the data from UEs 401-402 and write data to UEs 401-402 over AF 444, core NEF 443, and edge NEF 423. UE 402 may use 5GNR, WIFI, or ENET to access the edge NEF slice and may use these access technologies simultaneously.

UEs 401-402 may handover from 5GNR AN 411 and edge data center 420 to 5GNR AN 412 and edge data center 430. On some handovers from serving 5GNR AN 411 and edge data center 420 to target 5GNR AN 412 and edge data center 430, serving NEF 423 comprises an anchor NEF that handles the NEF session, and target NEF 433 comprises proxy NEF that interfaces with mobile UEs 401-402. On other handovers from serving 5GNR AN 411 and edge data center 420 to target 5GNR AN 412 and edge data center 430, serving NEF 423 transfers UE context to target NEF 433 to move the NEF anchor to NEF 433. To perform the handovers, SMF 442 may select a new NEF address for target NEF 433—possibly based on the location of UEs 401-402.

UE 402 may also handover between WIFI ANs 413-414 and ENET ANs 415-416 using make-before-break or break-before-make connections.

In some examples, UE 401 and UE 402 execute Application Server (AS) user applications and Application Function (AF) user applications. In UEs 401-402, the AS/AF user applications exchange API calls and responses with edge NEFs 423 and 433 over 5GNR, WIFI, or ENET—even when UEs 401-402 are mobile. Edge NEFs 423 and 433 may exchange some of the API calls and responses with core NEF 443, AF 444, and AS 445.

Figure 5:
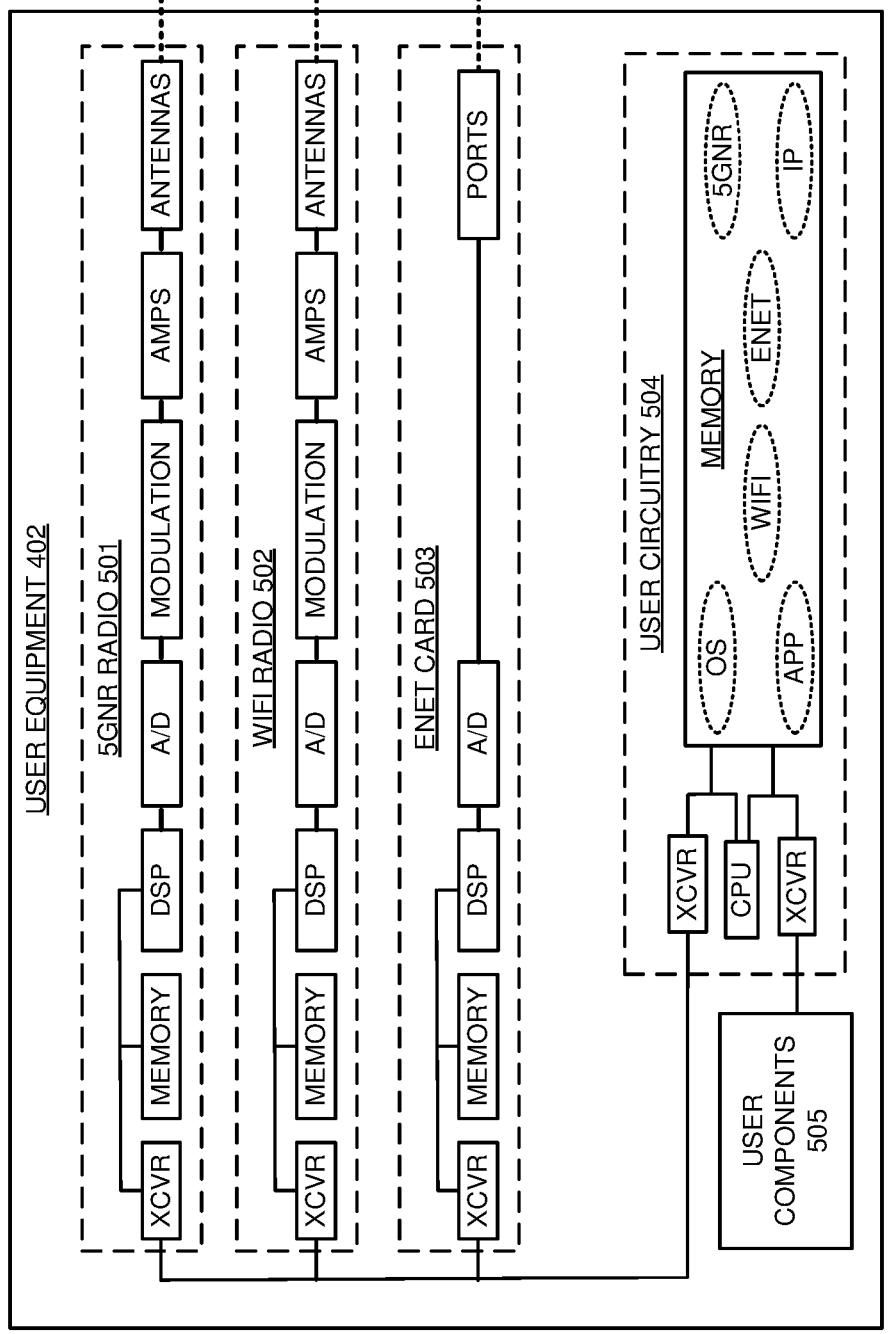
FIG. 5 illustrates an exemplary UE in the 5G wireless communication network.

FIG. 5 illustrates exemplary UE 402 in 5G wireless communication network 400. UE 402 comprises an example of UEs 101-102 and 401, although these UEs may differ. UE 402 comprises 5GNR radio 501, WIFI radio 502, ENET card 503, user circuitry 504, and user components 505. User components 505 comprise sensors, controllers, displays, or some other user apparatus. Radios 501-502 comprise antennas, amplifiers, filters, modulation, analog-to-digital interfaces, DSP, memory, radio applications, and transceivers that are coupled over bus circuitry. Card 503 comprises ports, analog-to-digital interfaces, DSP, memory, radio applications, and transceivers that are coupled over bus circuitry. User circuitry 504 comprises memory, CPU, user interfaces and components, and transceivers that are coupled over bus circuitry. The memory in user circuitry 504 stores an operating system (OS), user applications (APP), and network applications for ENET, WIFI, 5GNR, and IP. The user applications may comprise AS applications and AF applications that interact with edge NEFs 423 and 433. The antennas in 5GNR radio 501 are wirelessly coupled to 5GNR AN 413 over a 5GNR link. The antennas in WIFI radio 502 are wirelessly coupled to WIFI AN 413 over a WIFI link. The port in ENET card 503 is wireline coupled to ENET AN 415 over an ENET link. Transceivers (XCVR) in radios 501-502 and card 503 are coupled to transceivers in user circuitry 504. Transceivers in user circuitry 504 are coupled to user components 505. The CPU in user circuitry 504 executes the operating system, user applications, and network applications to exchange network signaling and user data with ANs 411-416. In other UEs, one or two of radios 501-502 and card 503 could be omitted to form UEs that are 5GNR-only, WIFI-only, ENET-only, WIFI/ENET-only, or some other combination—including the use of other network interfaces.

Figure 6:
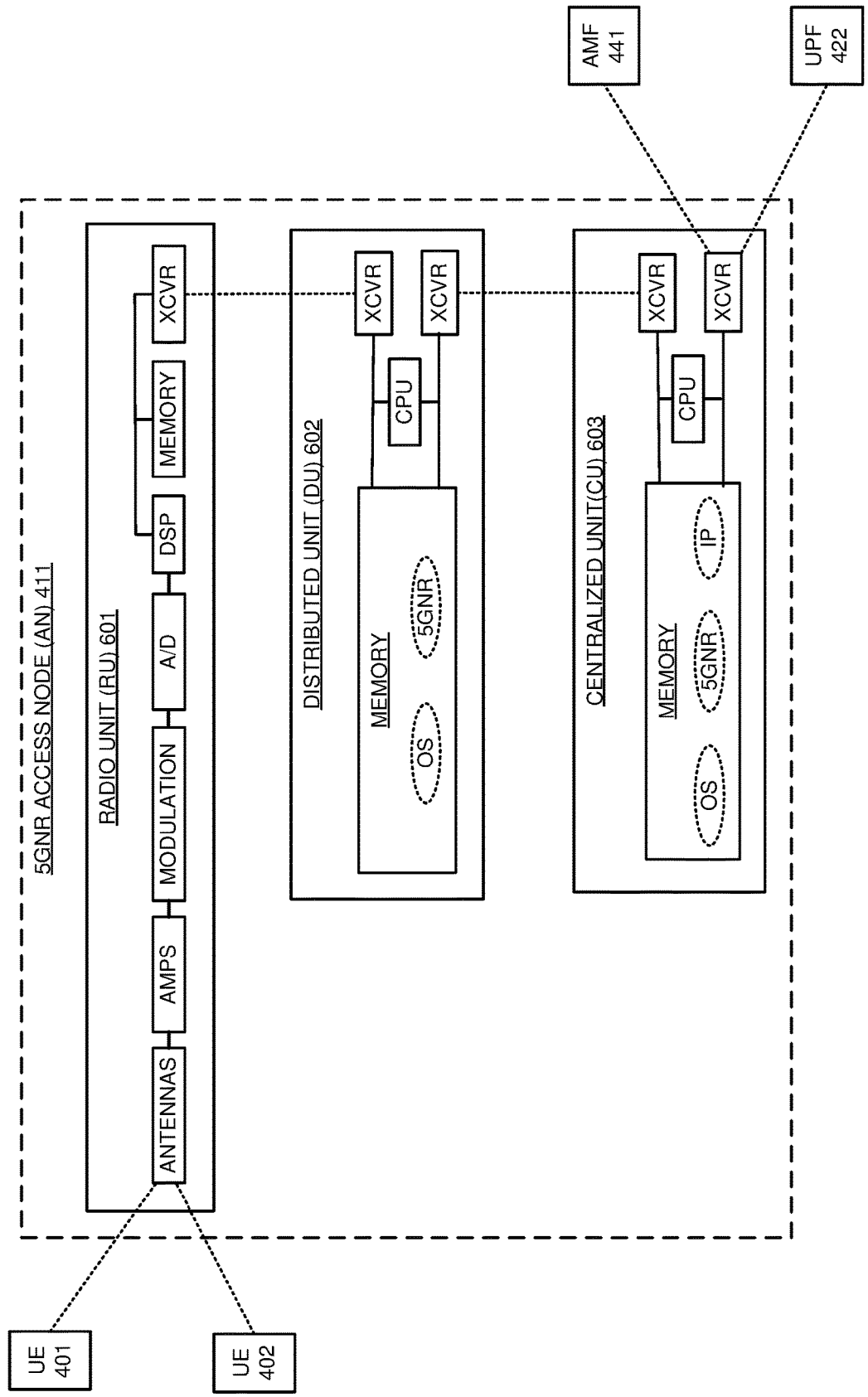
FIG. 6 illustrates an exemplary 5G New Radio (5GNR) Access Node (AN) in the 5G wireless communication network.

FIG. 6 illustrates exemplary 5G New Radio (NR) Access Node (AN) 411 in 5G wireless communication network 400. 5GNR AN 411 comprises an example of wireless access nodes 110 and 412, although access nodes 110 and 412 may differ. 5GNR AN 411 comprises Radio Unit (RU) 601, Distributed Unit (DU) 602, and Centralized Unit (CU) 603. RU 601 comprises 5GNR antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores an operating system and 5GNR network applications (Physical Layer, Media Access Control, Radio Link Control). CU 603 comprises memory, CPU, user interfaces and components, and transceivers that are coupled over bus circuitry. The memory in CU 603 stores an operating system, IP, and 5GNR network applications (Packet Data Convergence Protocol, Service Data Adaptation Protocol, Radio Resource Control). The antennas in RU 601 are wirelessly coupled to UEs 401-402 over 5GNR links. Transceivers in RU 601 are coupled to transceivers in DU 602. Transceivers in DU 602 are coupled to transceivers in CU 603. Transceivers in CU 603 are coupled to AMF 441 and UPF 422. The DSP and CPU in RU 601, DU 602, and CU 603 execute operating systems, radio applications, and 5GNR applications to exchange network signaling and user data with UEs 401-402, AMF 441, and UPF 422.

Figure 7:
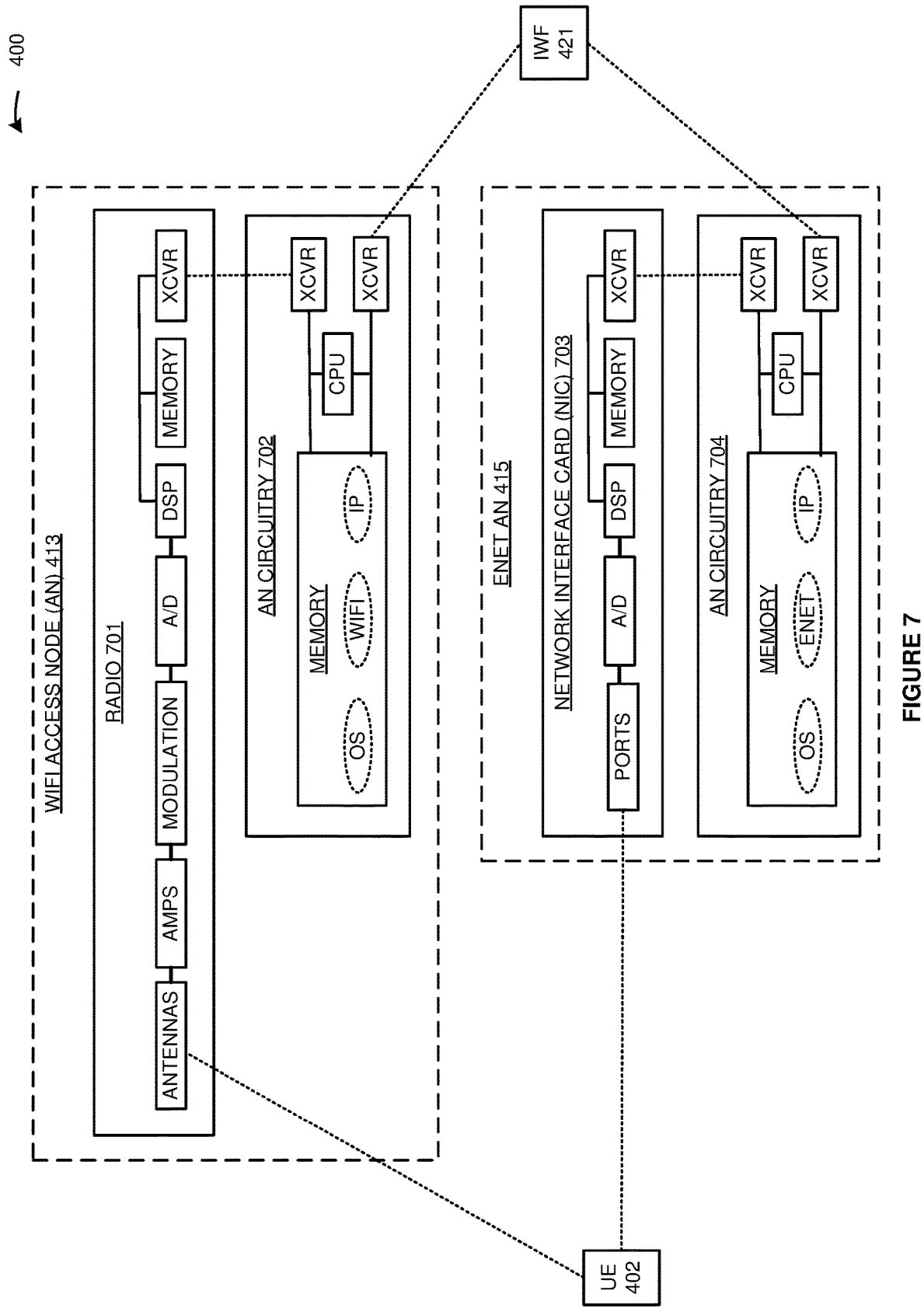
FIG. 7 illustrates an exemplary IEEE 802.11 (WIFI) AN and an exemplary IEEE 802.3 (ENET) AN in the 5G wireless communication network.

FIG. 7 illustrates exemplary IEEE 802.11 (WIFI) AN 413 and exemplary IEEE 802.3 (ENET) AN 415 in 5G wireless communication network 400. WIFI AN 413 comprises an example of wireless access nodes 110 and 414, although access nodes 110 and 414 may differ. ENET AN 415 comprises an example of AN 416, although AN 416 may differ. WIFI AN 413 comprises radio 701 and AN circuitry 702. Radio 701 comprises 5GNR antennas, amplifiers, filters, modulation, analog-to-digital interfaces, DSP, memory, radio applications, and transceivers that are coupled over bus circuitry. AN circuitry 702 comprises memory, CPU, user components, and transceivers that are coupled over bus circuitry. The memory in AN circuitry 702 stores an operating system and WIFI network applications (Physical Layer, Media Access Control, Radio Link Control). The antennas in radio are wirelessly coupled to UE 402 over a WIFI link. Transceivers in radio 701 are coupled to transceivers in AN circuitry 702. Transceivers in AN circuitry 702 are coupled to non-3GPP IWF 421. The DSP and CPU in radio 701 and AN circuitry 702 execute operating systems, radio applications, and WIFI applications to exchange network signaling and user data with UE 402 and IWF 421.

ENET AN 415 comprises an example of ENET AN 416, although AN 416 may differ. ENET AN 415 comprises Network Interface Card (NIC) 703 and AN circuitry 704. NIC 703 comprises ports, analog-to-digital interfaces, DSP, memory, and transceivers that are coupled over bus circuitry. AN circuitry 704 comprises memory, CPU, user components, and transceivers that are coupled over bus circuitry. The memory in AN circuitry 704 stores an operating system and ENET network applications. The ports in NIC 703 are wireline coupled to UE 402 over an ENET link. Transceivers in NIC 703 are coupled to transceivers in AN circuitry 704. Transceivers in AN circuitry 704 are coupled to non-3GPP IWF 421. The DSP and CPU in NIC 703 and AN circuitry 704 execute operating systems and ENET applications to exchange network signaling and user data with UE 402 and IWF 421.

Figure 8:
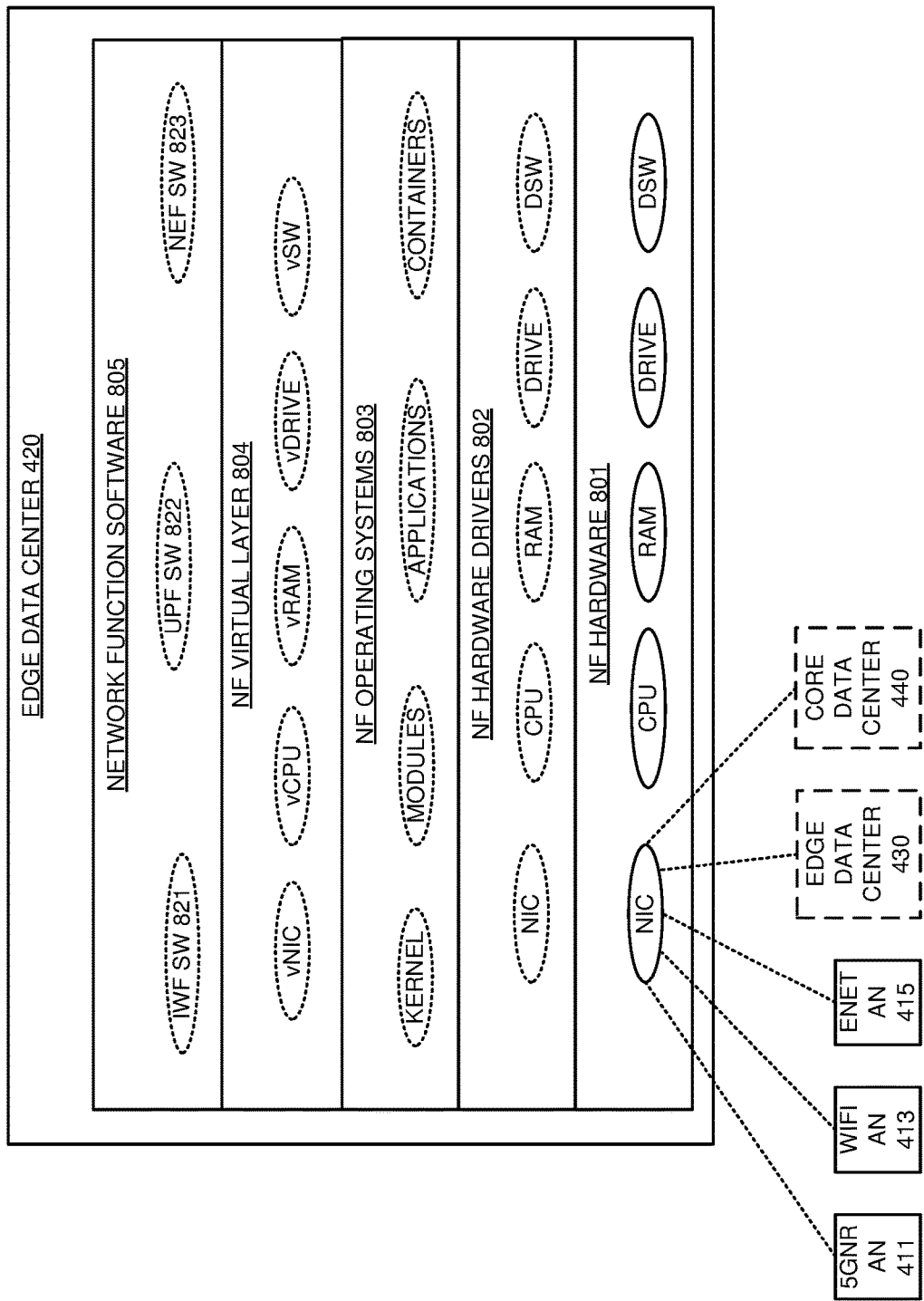
FIG. 8 illustrates an exemplary edge data center in the 5G wireless communication network.

FIG. 8 illustrates exemplary edge data center 420 in 5G wireless communication network 400. Data center 420 comprises an example of NEF slice 120 and edge data center 430, although NEF slice 120 and data center 430 may differ. Edge data center 420 comprises Network Function (NF) hardware 801, NF hardware drivers 802, NF operating systems 803, NF virtual layer 804, and NF Software (SW) 805. NF hardware 801 comprises Network Interface Cards (NICs), CPU, RAM, Flash/Disk Drives (DRIVE), and Data Switches (DSW). NF hardware drivers 802 comprise software that is resident in the NIC, CPU, RAM, DRIVE, and DSW. NF operating systems 803 comprise kernels, modules, and applications that form containers for virtual layer and NF software execution. NF virtual layer 804 comprises vNIC, vCPU, vRAM, vDRIVE, and vSW. NF SW 805 comprises IWF SCP SW 821, UPF SW 822, and NEF SW 823. Other NFs like Network Repository Function (NRF) are typically present but are omitted for clarity. Edge data center 420 may be located at a single site or be distributed across multiple geographic locations. The NIC in NF hardware 801 are coupled to ANs 411, 413, and 415, edge data center 430, and core data center 440. NF hardware 801 executes NF hardware drivers 802, NF operating systems 803, NF virtual layer 804, and NF SW 805 to form and operate IWF 421, UPF 422, and NEF 423.

Figure 9:
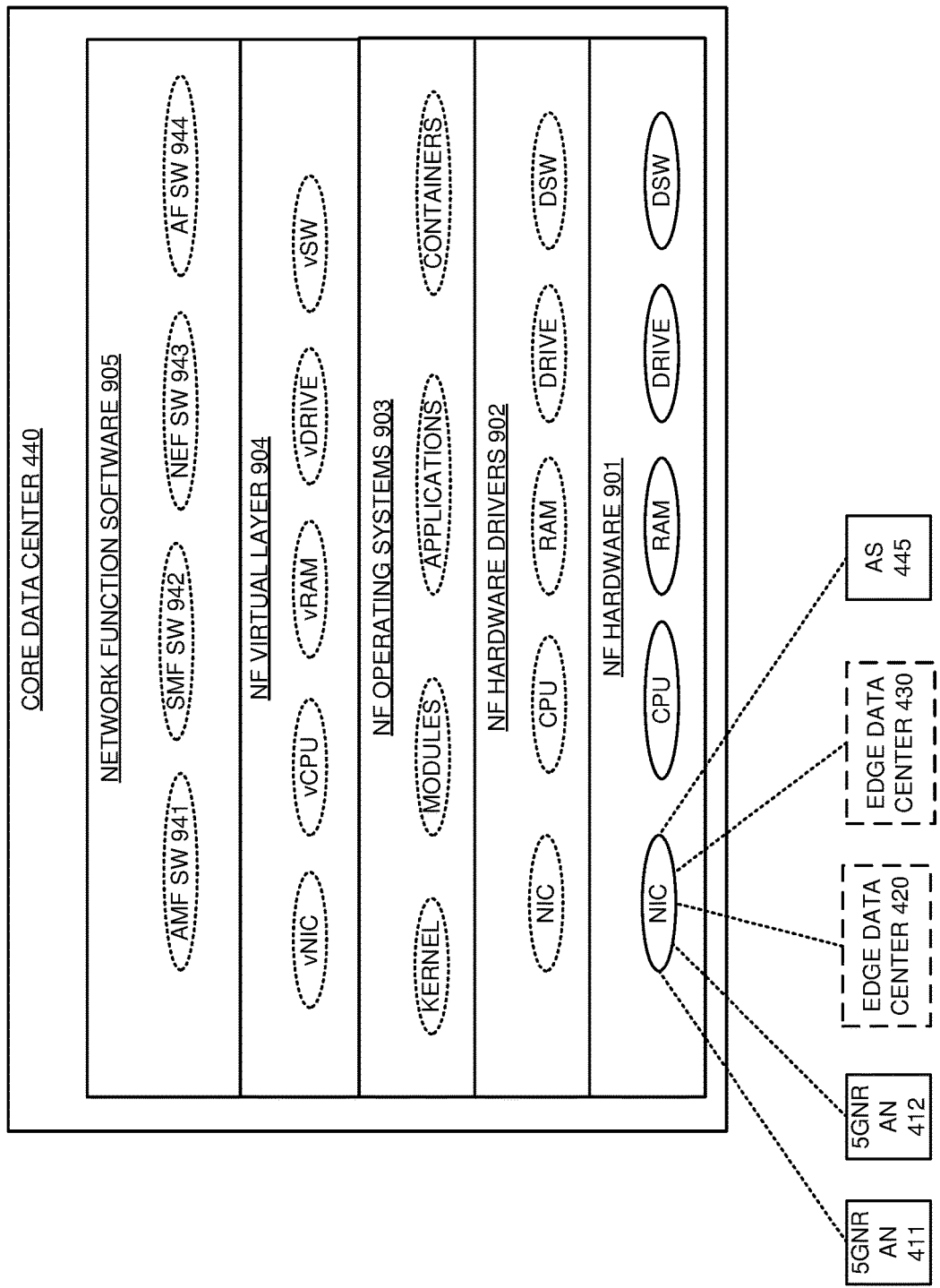
FIG. 9 illustrates an exemplary core data center in the 5G wireless communication network.

FIG. 9 illustrates exemplary core data center 440 in 5G wireless communication network 400. Core data center 440 comprises an example of AMF 111 and SMF 112, although these network functions may differ. Core data center 440 comprises NF hardware 901, NF hardware drivers 902, NF operating systems 903, NF virtual layer 904, and NF SW 905. NF hardware 901 comprises NICs, CPU, RAM, DRIVE, and DSW. NF hardware drivers 902 comprise software that is resident in the NIC, CPU, RAM, DRIVE, and DSW. NF operating systems 903 comprise kernels, modules, and applications that form containers for virtual layer and NF software execution. NF virtual layer 904 comprises vNIC, vCPU, vRAM, vDRIVE, and vSW. NF SW 905 comprises AMF SW 941, SMF SW 942, NEF SW 943, and AF SW 944. Other NFs like Unified Data Management (UDM) are typically present but are omitted for clarity. Core data center 440 may be located at a single site or be distributed across multiple geographic locations. The NIC in NF hardware 901 are coupled to 5GNR ANs 411-412, edge data centers 420 and 430, and AS 445. NF hardware 901 executes NF hardware drivers 902, NF operating systems 903, NF virtual layer 904, and NF SW 905 to form and operate AMF 441, SMF 442, NEF 443, and AF 444.

Figure 10:
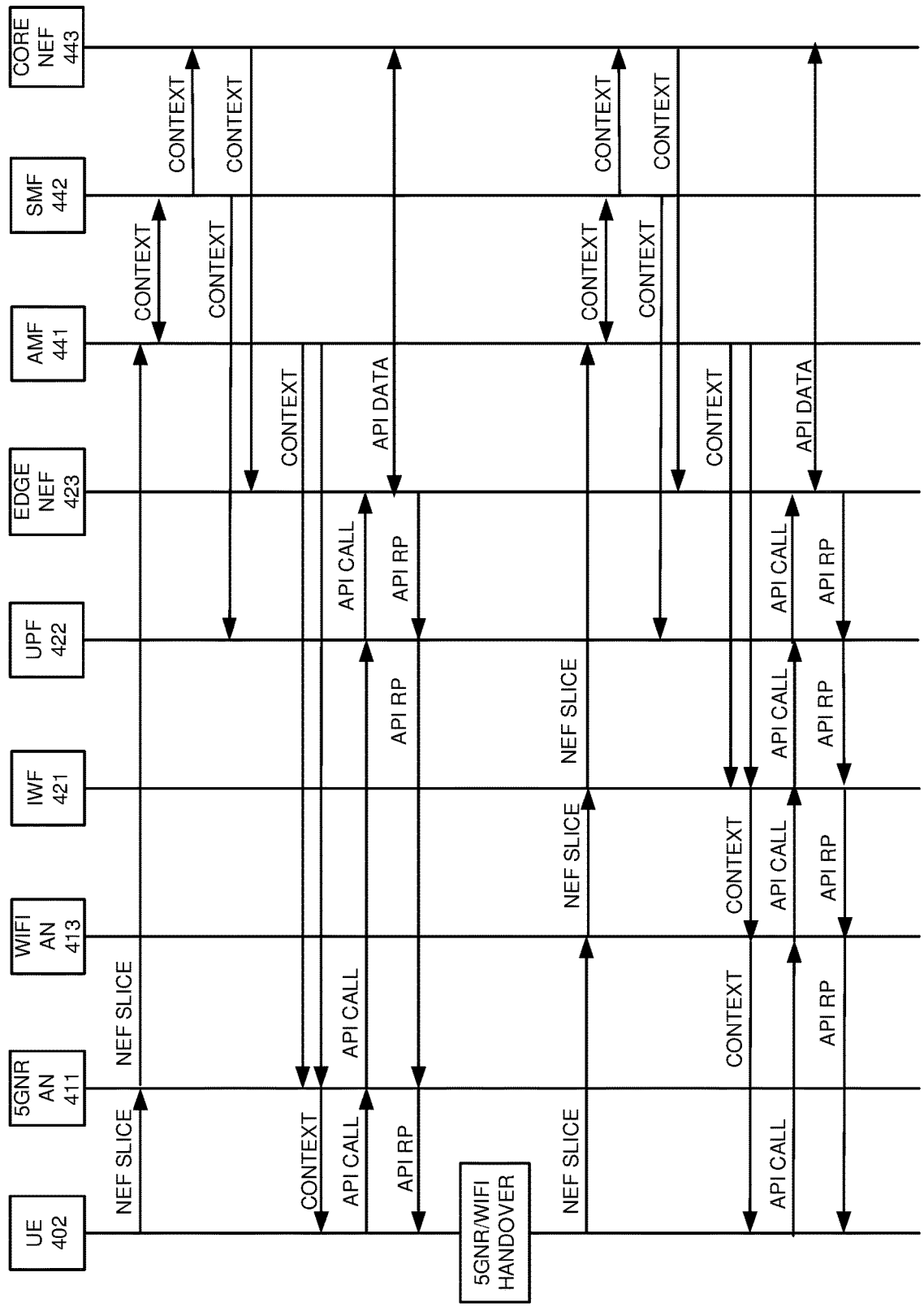
FIG. 10 illustrates an exemplary operation of the 5G wireless communication network to serve the mobile edge NEF slices to the UEs.

FIG. 10 illustrates an exemplary operation of 5G wireless communication network 400 to serve the mobile edge NEF slices to the UE 402. The operation may vary in other examples. UE 402 attaches to 5GNR AN 411 and reports an edge NEF slice capability to AMF 441. AMF 441 authorizes an edge NEF slice for UE 402. AMF 441 and interacts with SMF 442 to determine context for UE 402 and the edge NEF slice—including an address for edge NEF 423. AMF 441 may select the edge NEF slice for UE 402 based on the geographic location of UE 402. SMF 442 may select the address for edge NEF 423 based on the geographic location of UE 402. AMF 441 signals the context to 5GNR AN 411 and UE 402. SMF 442 signals the context to edge UPF 422 and core NEF 443. Core NEF 443 signals the context to edge NEF 423. UE 401 uses the edge NEF address to transfer Application Programming Interface (API) calls to edge NEF 423 over 5GNR AN 411 and edge UPF 422. Edge NEF 423 and core NEF exchange API data to serve some of the API calls. Edge NEF 423 transfers API responses for the API calls to UE 402 over edge UPF 422 and 5GNR AN 411.

UE 402 performs a 5GNR/WIFI handover—perhaps based on signal quality. UE 402 wirelessly attaches to WIFI AN 413. UE 402 registers with edge IWF 421 over WIFI AN 413. UE 402 reports an edge NEF slice capability to AMF 441 over edge IWF 421. AMF 441 authorizes the edge NEF slice for UE 402. AMF 441 interacts with SMF 442 to determine context for UE 402 and the edge NEF slice—including an address for edge NEF 423. AMF 441 may select the edge NEF slice for UE 402 based on the geographic location of UE 402. SMF 442 may select the address for edge NEF 423 based on the geographic location of UE 402. AMF 441 signals the context to edge IWF 421 and UE 401. SMF 442 signals the context to edge UPF 422 and core NEF 443. Core NEF 443 signals the context to edge NEF 423. UE 402 uses the edge NEF address to transfer API calls to edge NEF 423 over WIFI AN 413, IWF 421, and UPF 422. Edge NEF 423 and core NEF 443 exchange API data to serve some of the API calls. Edge NEF 423 transfers API responses for the API calls to UE 402 over edge UPF 422, edge IWF 421, and WIFI AN 413.

Figure 11:
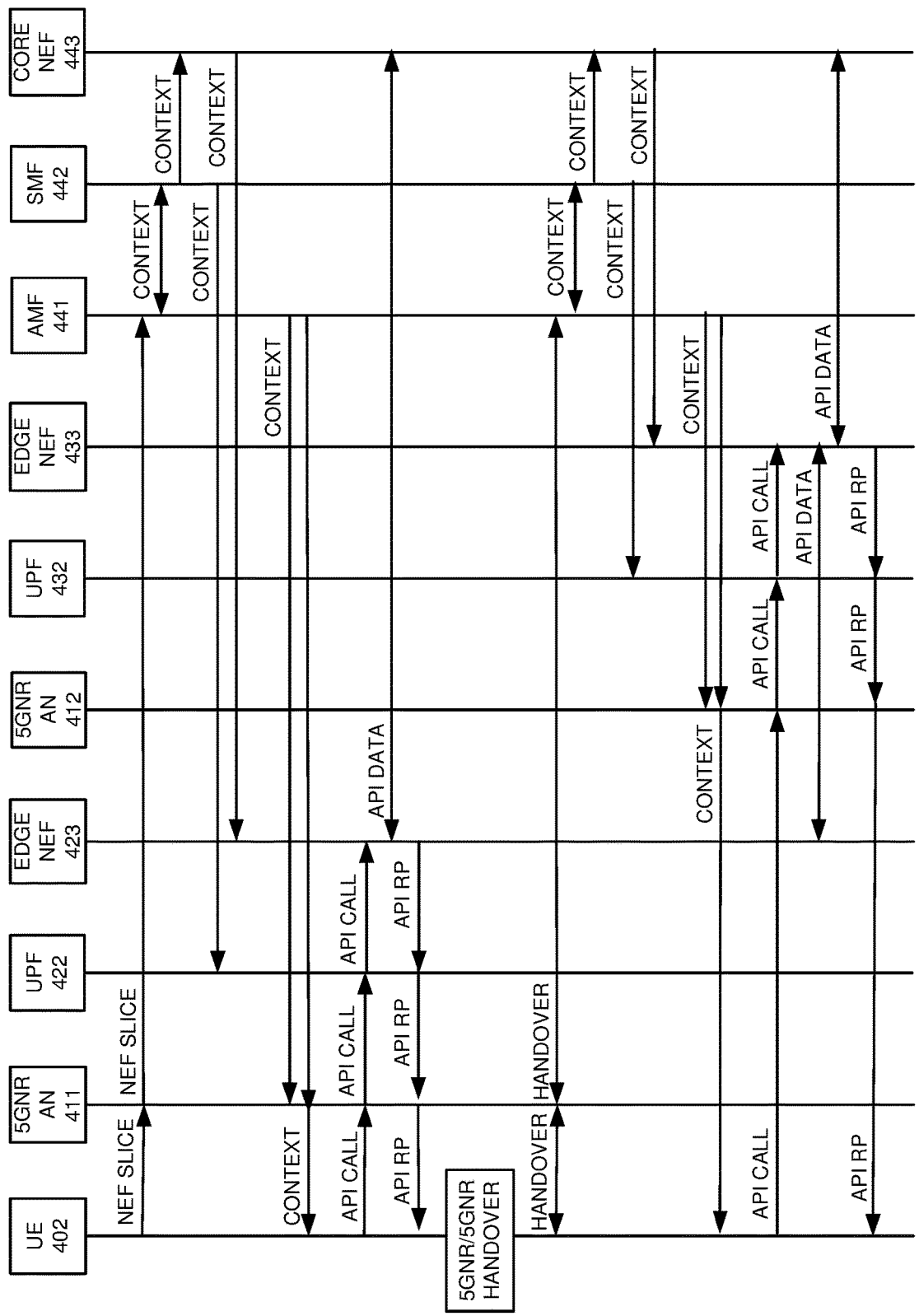
FIG. 11 illustrates an exemplary operation of the 5G wireless communication network to serve the mobile edge NEF slices to the UEs.

FIG. 11 illustrates an exemplary operation of 5G wireless communication network 400 to serve the mobile edge NEF slices to UE 402. The operation may vary in other examples. UE 402 attaches to 5GNR AN 411 and reports an edge NEF slice capability to AMF 441. AMF 441 authorizes an edge NEF slice for UE 402. AMF 441 and interacts with SMF 442 to determine context for UE 402 and the edge NEF slice—including an address for edge NEF 423. AMF 441 may select the edge NEF slice for UE 402 based on the geographic location of UE 402. SMF 442 may select the address for edge NEF 423 based on the geographic location of UE 402. AMF 441 signals the context to 5GNR AN 411 and UE 402. SMF 442 signals the context to edge UPF 422 and core NEF 443. Core NEF 443 signals the context to edge NEF 423. UE 402 uses the edge NEF address to transfer API calls to edge NEF 423 over 5GNR AN 411 and edge UPF 422. Edge NEF 423 and core NEF exchange API data to serve some of the API calls. Edge NEF 423 transfers API responses for the API calls to UE 402 over edge UPF 422 and 5GNR AN 411.

UE 402 performs a 5GNR/5GNR handover—perhaps based on signal quality. UE 402 and 5GNR AN 411 exchange handover signaling. 5GNR AN 411 and AMF 441 exchange handover signaling. AMF 441 and interacts with SMF 442 to update context for UE 402 and the edge NEF slice—including an address for edge NEF 433. SMF 442 may select the address for edge NEF 433 based on the geographic location of UE 402. AMF 441 signals the context to 5GNR AN 412 and UE 402. SMF 442 signals the context to edge UPF 432 and core NEF 443. Core NEF 443 signals the context to edge NEF 433. UE 402 uses the edge NEF address to transfer API calls to edge NEF 433 over 5GNR AN 412 and edge UPF 432. Edge NEF 433 and edge NEF 432 exchange API data to serve some of the API calls—and in some examples—NEF 423 comprises the anchor NEF and NEF 433 comprises the proxy NEF for mobile UE 402. Edge NEF 433 and core NEF 443 exchange API data to serve some of the API calls. Edge NEF 433 transfers API responses for the API calls to UE 402 over edge UPF 432 and 5GNR AN 412.

Figure 12:
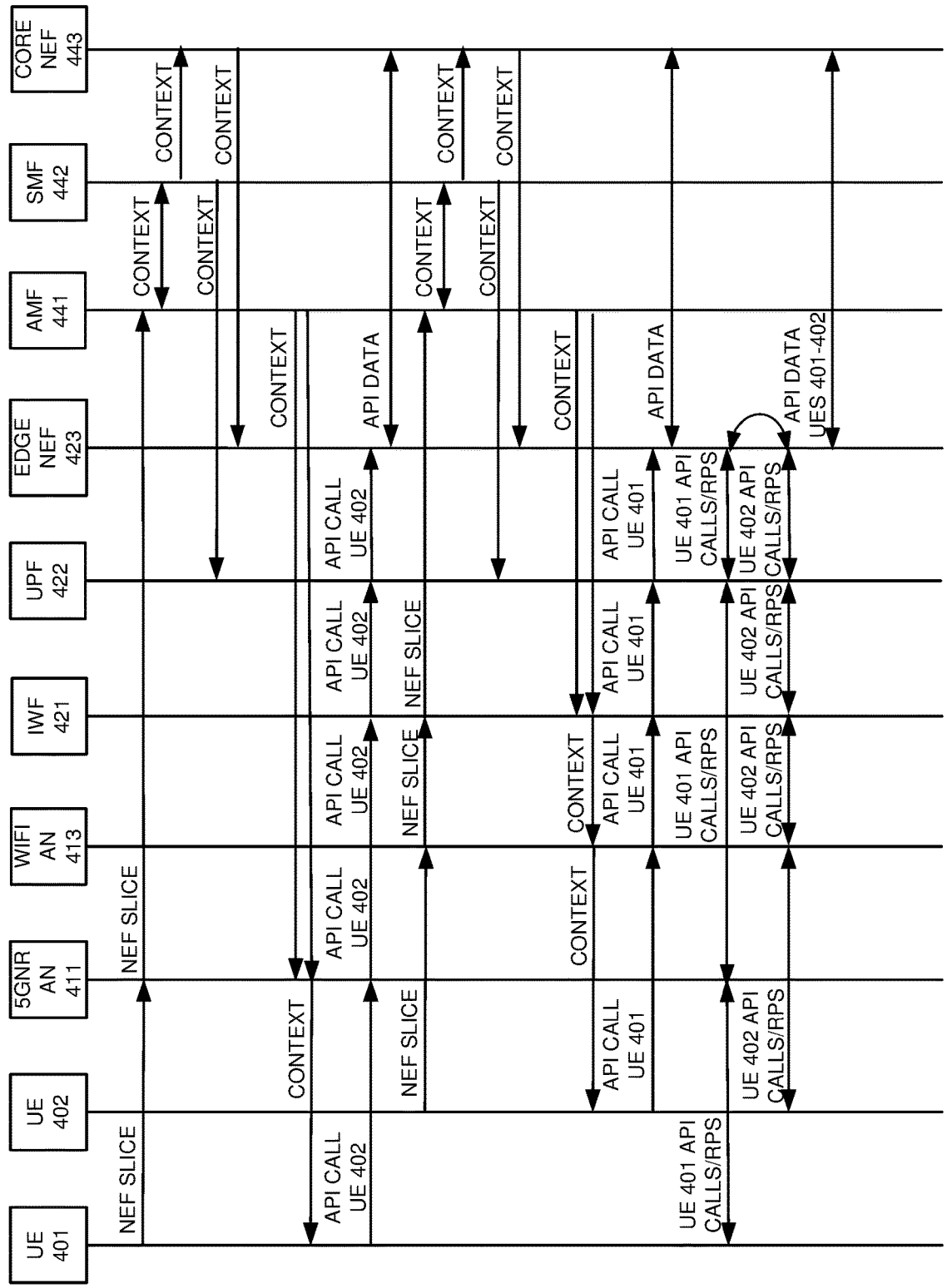
FIG. 12 illustrates an exemplary operation of the 5G wireless communication network to serve the mobile edge NEF slices to the UEs.

FIG. 12 illustrates an exemplary operation of 5G wireless communication network 400 to serve the mobile edge NEF slices to UEs 401-402. The operation may vary in other examples. UE 401 attaches to 5GNR AN 411 and reports an edge NEF slice capability to AMF 441. AMF 441 authorizes an edge NEF slice for UE 401. AMF 441 and interacts with SMF 442 to determine context for UE 401 and the edge NEF slice—including an address for edge NEF 423. AMF 441 may select the edge NEF slice for UE 401 based on the geographic location of UE 401. SMF 442 may select the address for edge NEF 423 based on the geographic location of UE 401. AMF 441 signals the context to 5GNR AN 411 and UE 401. SMF 442 signals the context to edge UPF 422 and core NEF 443. Core NEF 443 signals the context to edge NEF 423. UE 401 uses the edge NEF address to transfer an API call for UE 402 information to edge NEF 423 over 5GNR AN 411 and edge UPF 422. Edge NEF 423 and core NEF 4443 exchange API data to serve the API call.

UE 402 wirelessly attaches to WIFI AN 413. UE 402 registers with edge IWF 421 over WIFI AN 413. UE 402 reports an edge NEF slice capability to AMF 441 over edge IWF 421. AMF 441 authorizes the edge NEF slice for UE 402. AMF 441 interacts with SMF 442 to determine context for UE 402 and the edge NEF slice—including an address for edge NEF 423. AMF 441 may select the edge NEF slice for UE 402 based on the geographic location of UE 402. SMF 442 may select the address for edge NEF 423 based on the geographic location of UE 402. AMF 441 signals the context to edge IWF 421 and UE 402. SMF 442 signals the context to edge UPF 422 and core NEF 443. Core NEF 443 signals the context to edge NEF 423. UE 402 uses the edge NEF address to transfer an API call for UE 401 information to edge NEF 423 over WIFI AN 413, edge IWF 421, and edge UPF 422. Edge NEF 423 and core NEF 443 exchange API data to serve the API call.

In response to the API calls for UE information, edge NEF 423 transfers an API response to UE 401 with UE 402 information and transfers an API response to UE 402 with UE 401 information. UEs 401-402 now transfer API calls to edge NEF 423 and receive API response from edge NEF 423. These API interactions between UEs 401-402 and edge NEF 423 may occur with extremely low-latency. Thus, a user application in UEs 401-402 may exchange application data through edge NEF 423 in an asynchronous, low-latency manner. Edge NEF 423 and core NEF 443 may exchange additional API data to serve these API calls and responses. UEs 401-402 may move as a group and have their edge NEF slice follow them and serve mobile, asynchronous, low-latency edge NEF services.

In some examples, UE 401 and/or UE 402 comprises an AS application and an AF application. In UEs 401-402, the AS/AF applications exchange API calls and responses with edge NEFs 423 and 433 over 5GNR, WIFI, or ENET—even when UEs 401-402 are mobile. Edge NEFs 423 and 433 may exchange some of the API calls and responses with core NEF 443. For example, edge NEFs 423 and 433 may not be configured to handle a particular API call but could be configured to forward the API call to core NEF 443 which can handle the specific API call. In another example, a particular service or capability may utilize synchronization between edge NEFs 423 and core NEF 443 based on the service requirements and current location.

The wireless data network circuitry described above comprises computer hardware and software that form special-purpose network circuitry to serve NEF slices to UEs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve NEF slices to UEs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a Network Exposure Function (NEF) slice to User Equipment (UE), the method comprising:
    an Access and Mobility Management Function (AMF) selecting an edge NEF slice for the UE;
    a Session Management Function (SMF) selecting a NEF address for an edge NEF element based on the edge NEF slice for the UE;
    a User Plane Function (UPF) exchanging Application Programming Interface (API) messages between the UE and the edge NEF element for the edge NEF slice based on the NEF address; and
    the edge NEF element exchanging the API messages with the UE over the UPF for the edge NEF slice.

2. The method of claim 1 wherein the edge NEF element exchanging the API messages with the UE over the UPF comprises the edge NEF element exchanging the API messages with the UE over the UPF and the edge NEF element exchanging at least a subset of the API messages with a core NEF element.

3. The method of claim 1 wherein the edge NEF element exchanging the API messages with the UE over the UPF comprises the edge NEF element exchanging the API messages with the UE over the UPF and the edge NEF element exchanging API messages with an anchor NEF element.

4. The method of claim 1 wherein:
    in response to UE mobility, the SMF selecting a new NEF address for a new edge NEF element for the edge NEF slice for the UE;
    another UPF exchanging new API messages between the UE and the new edge NEF element based on the new NEF address for the edge NEF slice; and
    the new edge NEF element exchanging the new API messages with the UE over the other UPF for the edge NEF slice.

5. The method of claim 4 further comprising the edge NEF element transferring context for the UE to the new edge NEF element.

6. The method of claim 1 further comprising:
    the AMF selecting a local NEF slice for another UE based on a geographic location of the other UE; and
    the SMF selecting another NEF address for a local NEF element;
    the UPF exchanging the API messages between the other UE and the local NEF element for the local NEF slice; and
    the local NEF element exchanging the API messages with the other UE over the UPF for the local NEF slice.

7. The method of claim 1 wherein the edge NEF exchanging the API messages with the UE comprises the edge NEF receiving UE status data from a user application in the UE.

8. The method of claim 1 wherein the edge NEF exchanging the API messages with the UE comprises the edge NEF receiving a network request from an Application Server (AS) for the UE.

9. The method of claim 1 wherein the UPF exchanging the API messages between the UE and the edge NEF comprises exchanging the API messages between a non-Third Generation Partnership Project (non-3GPP) UE and the edge NEF over a non-3GPP Interworking Function (IWF) and the UPF.

10. A wireless communication network to serve a Network Exposure Function (NEF) slice to User Equipment (UE), the wireless communication network comprising:
    an Access and Mobility Management Function (AMF) configured to select an edge NEF slice for the UE;
    a Session Management Function (SMF) configured to select a NEF address for an edge NEF element based on the edge NEF slice for the UE;
    a User Plane Function (UPF) configured to exchange Application Programming Interface (API) messages between the UE and the edge NEF element for the edge NEF slice based on the NEF address; and
    the edge NEF element configured to exchange the API messages with the UE over the UPF for the edge NEF slice.

11. The wireless communication network of claim 10 further comprising:
    a core NEF element; and wherein:
    the edge NEF element is configured to exchange the API messages with the UE over the UPF and exchange at least a subset of the API messages with the core NEF element to exchange the API messages with the UE over the UPF.

12. The wireless communication network of claim 10 further comprising:
    an anchor NEF element; and wherein:
    the edge NEF element is configured to exchange the API messages with the UE over the UPF and exchange the API messages with the anchor NEF to exchange the API messages with the UE over the UPF.

13. The wireless communication network of claim 10 wherein:
    in response to UE mobility, the SMF is further configured to select a new NEF address for a new edge NEF element for the edge NEF slice for the UE; and further comprising:
    another UPF configured to exchange new API messages between the UE and the new edge NEF element based on the new NEF address for the edge NEF slice;
    the new edge NEF element configured to exchange the new API messages with the UE over the other UPF for the edge NEF slice; and wherein:
    the edge NEF element is further configured to transfer context for the UE to the new edge NEF element.

14. The wireless communication network of claim 10 further comprising:
    a local NEF element; and wherein:
    the AMF is further configured to select a local NEF slice for another UE based on a geographic location of the other UE;
    the SMF is further configured to select another NEF address for a local NEF element;
    the UPF is further configured to exchange the API messages between the other UE and the local NEF element for the local NEF slice; and the local NEF element is configured to exchange the API messages with the other UE over the UPF for the local NEF slice.

15. The wireless communication network of claim 10 wherein the edge NEF is further configured to receive UE status data from a user application in the UE to exchange the API messages with the UE.

16. The wireless communication network of claim 10 wherein the edge NEF is further configured to receive a network request from an Application Server (AS) for the UE to exchange the API messages with the UE.

17. The wireless communication network of claim 10 wherein the UPF is further configured to exchange the API messages between a non-Third Generation Partnership Project (non-3GPP) UE and the NEF over a non-3GPP Interworking Function (IWF) and the UPF to exchange the API messages between the UE and the NEF.

18. A wireless communication network comprising:
    a core data center configured to execute an Access and Mobility Management Function (AMF), Session Management Function (SMF), and core Network Exposure Function (NEF);
    an edge data center configured to execute a User Plane Function (UPF) and an edge NEF;
    the AMF configured to authorize a User Equipment (UE) for an edge NEF slice that comprises the edge NEF and select the edge NEF slice based on the authorization;
    the SMF configured to select a NEF address for the edge NEF based on the edge NEF slice for the UE to determine context for the UE and the edge NEF slice;
    the UPF configured to exchange Application Programming Interface (API) messages between the UE and the edge NEF for the edge NEF slice based on the NEF address;
    the edge NEF configured to exchange the API messages with the UPF and the core NEF; and
    the core NEF configured to exchange the API messages with the edge NEF.

19. The communication network of claim 18 wherein the edge NEF is further configured to receive UE status data from a user application in the UE.

20. The communication network of claim 18 wherein the edge NEF is further configured to receive a network request from an Application Server (AS) for the UE.

* * * * *